United States Patent [19]

Matsumoto

[11] Patent Number: 4,785,756
[45] Date of Patent: Nov. 22, 1988

[54] VESSEL HAVING PROPELLER ARRANGED ON VERTICAL HULL CENTER PLANE

[75] Inventor: Norihiro Matsumoto, Tokyo, Japan

[73] Assignee: Nippon Kokan Kabushiki Kaisha, Tokyo, Japan

[21] Appl. No.: 68,943

[22] Filed: Jul. 1, 1987

[30] Foreign Application Priority Data

Aug. 6, 1986 [JP] Japan .................. 61-183474

[51] Int. Cl.⁴ .............................................. B63B 1/00
[52] U.S. Cl. .......................................... 114/57; 440/79
[58] Field of Search ................... 440/49, 66, 67, 68, 440/75, 79–83; 114/56, 57

[56] References Cited

U.S. PATENT DOCUMENTS 4,363,630 12/1982 Di Vigano .................. 440/79
4,538,537 9/1985 Nonecke .................... 440/66

FOREIGN PATENT DOCUMENTS 47-37315 9/1972 Japan .
288689 4/1928 United Kingdom .
520984 5/1940 United Kingdom .
1129584 10/1968 United Kingdom .
1362125 7/1974 United Kingdom .

*Primary Examiner*—Joseph F. Peters, Jr.
*Assistant Examiner*—Jesús D. Sotelo
*Attorney, Agent, or Firm*—Frishauf, Holtz, Goodman & Woodward

[57] ABSTRACT

A vessel equipped with a single screw comprising a propeller shaft positioned on the vertical hull center plane, an upper deck portion which is substantially symmetrical with respect to the vertical hull center plane, and a stern portion having a longitudinal plane passing through a stern end of the vessel. The longitudinal plane of the stern portion is positioned laterally offset from the vertical hull center plane by 5 to 25% of a diameter of a propeller disc plane. The longitudinal plane of the stern portion is positioned on the port side when the propeller shaft is rotated clockwise. The longitudinal plane of the stern portion is positioned on the starboard side when the propeller shaft is rotated counterclockwise.

5 Claims, 2 Drawing Sheets

VESSEL HAVING PROPELLER ARRANGED ON VERTICAL HULL CENTER PLANE

BACKGROUND OF THE INVENTION

1. Field of the Invention

The present invention relates to a hull form of a vessel, and more particularly to a structure of a stern part of a vessel.

2. Description of the Related Art

It is well known that a conventional single screw vessel is equippedwith a propeller shaft located on the vertical central plane of the hull, regardless of being symmetrical about the hull center line or not. Water-flows, generated under the stern part of such a symmetrical vessel, flow into propeller blades, downwards from above and inwards from outside, symmetrically with regard to the propeller shaft of the vessel, to form vertical vortices around longitudinal axes. Water-inflows to the propeller blades, in the case of an asymmetrical type vessel, form asymmetrical flows. Thus, complicated distribution of wakes is generated during sailing.

Large vessels with high block coefficients and wide breadth have been increasing in number in order to improve loading capacity. Because of the high blockage coefficient and the wide breadth, vertical vortices around longitudinal axes generated on a propeller disc plane from the aforementioned wakes, have increased even more. Those vertical vortices are generated in pairs at both vessel sides, causing the wakes to be unbalanced on the propeller disc plane. This results not only in reducing propulsive efficiency but also in increasing hull resistance.

In these circumstances, there have been demanded improvement in loading capacity and, at the same time, in reducing fuel consumption for sailing. To satisfy both demands, improvement in propulsive efficiency has become an indispensable requirement. Occurrence of vertical vortices, which causes reduction of the propulsive efficiency of a vessel, has been unavoidable to a vessel having a large load capacity. To overcome this problem, arrangements of water-inflow directions to propeller blades have been taken, depending on a type of a vessel.

Japanese patent examined publication (KOKOKU) No. 37315/72, for example, descirbes a method wherein:

(1) A propeller shaft of a vessel is positioned on the vertical central plane of the hull, and the stern end edge of the vessel is positioned, by far, eccentrically from said vertical hull center plane;

(2) The distance between the vertical center plane and the line passing through the stern and edge is larger than the radius of the propeller disc plane which the propeller blades form by rotation, and the propeller disc plane is positioned, on one side of the vessel, completely off the vertical hull center plane; and (3) The generated vortices flow in the reverse direction of the propeller blade rotation.

This method, however, has the following drawbacks:

(a) The distance between the line passing throught the stern end edge and the vertical hull center plane is required to be longer tha the radius of the propeller disc plane, consequently, the distance from the vertical hull center plane to the stern end edge is forced to be large. This results not only in raising ship-building cost but also in affecting unfavorably the steering ability of a vessel.

(b) The shape of one side of the stern part becomes extremely slender in space. Resultantly, installation of engine machinery is tightly restricted, and transportation efficiency is badly affected.

SUMMARY OF THE INVENTION

It is a object of the present invention to provide a vessel having high propulsive efficiency.

According to the present invention, a vessel comprises a hull having a vertical hull center plane, and a single screw propulsion system. The single screw propulsion system includes a rotatable propeller shaft positioned on said vertical hull center plane; and a propeller coupled to the shaft. The propeller, when rotated by the shaft, forms a propeller disc plane of given diameter. The hull includes an upper deck portion arranged substantially symmetrically with respect to the vertical hull center plane; and a stern porton coupled to the upper deck portion, the stern portion having a longitudinal plane passing through a stern end of the vessel which is positioned laterally offset from the vertical hull center plane by 5 to 25% of the diameter of the propeller disc plane.

Other objects and advantages of the present invention will become apparent from the detailed description to follow taken in conjunction with the appended drawings.

DESCRIPTION OF THE PREFERRED EMBODIMENT

With reference specifically to the drawings, an embodiment according to the present invention will now be described.

Figure 1:
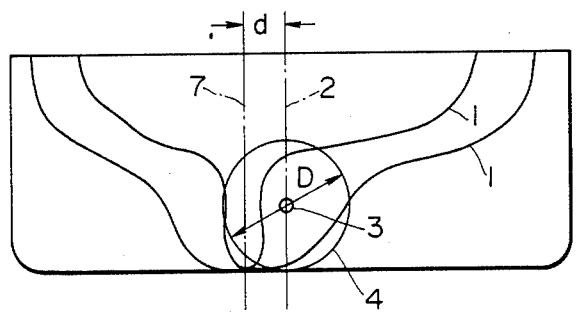
FIG. 1 is a body plan showing an embodiment of an afterbody of a vessel according to the present invention.

FIG. 1 represents a body plan viewed from the back side of the vessel. Reference numeral 1 denotes transverse sectional shapes of hull frames of the afterbody. Propeller shaft 3 is positioned on the vertical center plane 2 of the hull. Propeller blades are rotated clockwise on an axis of propeller shaft 3 to form propeller disc plane 4 having a diameter "D". The end edge of the stern is positioned laterally offset from the vertical longitudinal hull center plane 2, i.e. vertical plane 7 of the stern part of the afterbody is positioned, by distance "d", laterally offset from the vertical hull center plane 2.

Figure 2:
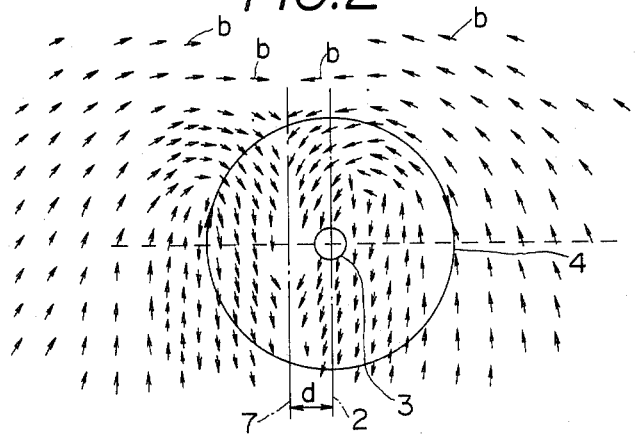
FIG. 2 is a graphic vector diagram showing water-inflows on a propeller disc plane according to the present invention.

Secondly, the work of the aforementioned positioning will be now explained, with particular reference to FIG. 2 of the drawing. FIG. 2 graphically represents a vector diagram illustrating transverse velocity of water-inflows to propeller disc plane 4, being viewed from the backward side. Vectors (b) of the water-inflows form circulating flows which are symmetrical with regard to vertical longitudinal plane 7. On the other hand, propeller shaft 3, positioned on the vertical hull center plane 2, forms propeller disc plane 4 rotating clockwise, on an axis of the vertical hull center plane.

Figure 3:
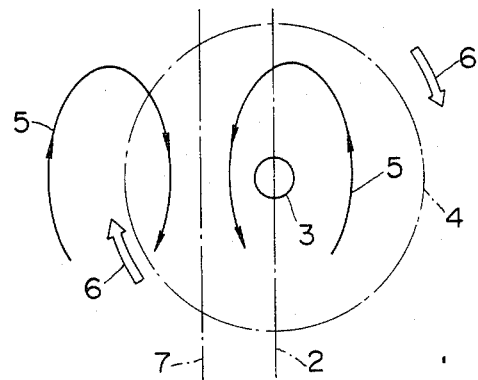
FIG. 3 is a graphic representation showing the relationship between water-inflows to propeller blades and rotation direction of the propeller according to the present invention.

FIG. 3 of the drawing illustrates the relationship between directions of the water inflows and of propeller blade rotation. Arrow 5 shows a direction of the water inflows as illustrated by vectors (b) shown in FIG. 2. Arrow 6 shows a direction of rotation of the propeller. As clearly understood from FIG. 3, the propeller blades receive the water-inflows having such a direction as shown by arrow 5, on its whole plane, against its rotating direction as shown by arrow 6. The directions of arrows 5 and 6 are completely reverse relative to each other. This reception of the reverse water-inflows gives such an effect as if the rotating speed of propeller shaft 3 were increased. Consequently, the aforementioned relationship can attain an increase in propulsive efficiency.

Figure 4:
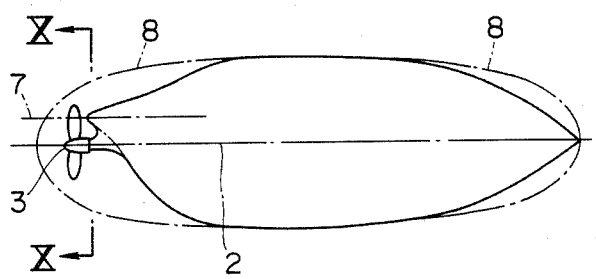
FIG. 4 is a plan view showing a general construction of an embodiment of the present invention.
Figure 5:
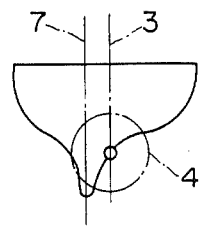
FIG. 5 is a sectonal view along line X—X of FIG. 4.

FIG. 4 represents a plan view showing a general construction of an embodiment according to the present invention. FIG. 5 represents a sectional view along line X—X of FIG. 4. As shown in FIGS. 4 and 5, vertical plane 7, passing through the stern end edge in the stern section, is positioned laterally offset from the vertical hull center plane 2, and contour line (i.e. the outline) of an upper deck portion is symmetrical with respect to the vertical hull center plane 2. Consequently, living comfortability and appearance of a vessel of this type is almost the same as those of conventional vessels.

In this embodiment, propeller shaft 3 is positioned on the vertical hull center plane 2, propeller blades are rotated clockwise, and vertical plan 7 of the stern section passing through the stern end edge is positioned, on the port side, offset from the vertical hull center plane 2. Another embodiment can be given, wherein propeller shaft 3 is positioned on the vertical hull center plane 2, propeller blades are rotated counterclockwise, and plane 7 is positioned, on the starboard side, laterally offset from the vertical hull center plane 2. In the case, however, where the propeller blades are rotated clockwise and plane 7 is positioned, on the starboard side, laterally offset from the vertical hull center plane 2, or in the case where the propeller blades are rotated counterclockwise and plane 7 is positioned, on the port side, laterally offset from the vertical hull center plane 2, those positionings are undesirable, since the propeller blades are rotated in the same direction of water-inflows to the propeller blades, whereby propulsive efficiency is reduced.

EXAMPLE

Figure 6:
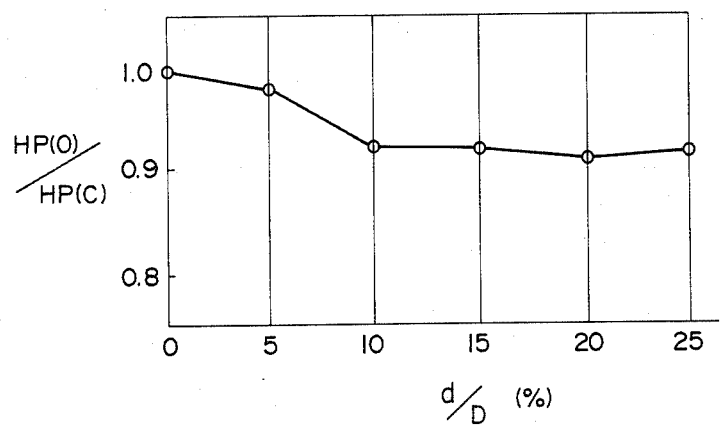
FIG. 6 is a graphic representation showing the relation of a distance between the propeller shaft and the end edge of the stern positioned eccentrically from the hull center line, to relative propulsive power ratio against a prior art vessel.

Relation of a level distance to propulsive efficiency will now be given, based on the results of a water tank test, with reference specifically to FIG. 6 of the drawing. The level distance is a distance between propeller shaft 3 and the stern end edge positioned laterally offset from the vertical hull center plane. In FIG. 6, the ordinate indicates a ratio of HP(O)/HP(C), where HP(O) represents propulsive horsepower generated from an engine equipped with a propeller shaft being positioned laterally offset from the vertical hull center plane and HP(C) represents propulsive horsepower from an engine of a conventional vessel equipped with a propeller shaft on the vertical hull center plane. The abscissa indicates a ratio of d/D, where d represents a level distance from the propeller shaft to the stern end edge and D represents a diameter of a propeller disc plane.

As clearly recognized from FIG. 6, the propulsive efficiency is remarkably increased when the d/D ratio ranges from 5 to 25%. If the ratio is less than 5%, the propulsive efficiency does not increase. On the other hand, if the ratio is over 25%, the propulsive efficiency does not increase, either. The most preferable ratio ranges from 10 to 25%. In addition to the above, according to other test results, it has been acertained that the rudder position was not required specifically to be restricted and that the steering ability was not unfavorably affected.

As described in the above, the present invention, keeping the sectional shape of an afterbody sinking into water to be only approximately symmetrical, and positioning the same to be slightly laterally offset from the vertical hull center plane, effected the following advantages:

(a) Vertical vortices around longitudinal axes, which had been a cause of reduced propulsive efficiency of a large vessel, were enabled to increase the propulsive efficiency by means of making use of water-inflows to the propeller blades which circulate reversely to the rotating direction of the propeller;

(b) The propulsive efficiency was increased more effectively by allowing the propeller disc plane to occupy the other vessel side in space with regard to the vertical hull center plane, so as to receive water-inflows along with such a vessel side, circulating reversely to the rotating direction of the propeller disc plane;

(c) The steering ability was almost unaffected by the aforementioned positioning since the stern end edge was positioned laterally offset, only a little, from the vertical hull center plane; and (d) The ship-building cost of a vessel of this hull shape was economical in comparison with that of a vessel of asymmetric shape since this hull shape is almost symmetrical.

What is claimed is:

1. A vessel comprising a hull having a vertical hull center plane, and a single crew propulsion system, comprising:

said single screw propulsion system including a rotatable propeller shaft positioned on said vertical hull center plane; and a propeller coupled to said shaft, said propeller, when rotated by said shaft, forming a propeller disc plane of given diameter;

said hull including an upper deck portion arranged substantially symmetrically with respect to said vertical hull center plane;

said hull further including a stern portion coupled to said upper deck portion, said stern portion having a longitudinal plane passing through a stern end of said vessel; and said longitudinal plane of said stern portion being positioned laterally offset from said vertical hull center plane by 5 to 25% of said diameter of said propeller disc plane.

2. The vessel of claim 1, wherein said longitudinal plane of said stern portion is positioned laterally offset from said vertical hull center plane by 10 to 15% of said diameter of said propeller disc plane.

3. The vessel of claim 1, wherein said propeller shaft is rotatable in the clockwise direction; and said longitudinal plane of said stern portion is positioned on the port side of said vessel when said propeller shaft is rotated in said clockwise direction.

4. The vessel of claim 1, wherein said propeller shaft is rotatable in the counterclockwise direction; and said longitudinal plane of said stern portion is positioned on the starboard side of said vessel when said propeller shaft is rotated in said counterclockwise direction.

5. The vessel of claim 1, wherein said longitudinal plane of said stern portion is a longitudinal vertical plane positioned on a line passing through a stern end edge of said vessel, said stern portion being asymmetrical about said longitudinal plane.

* * * * *